United States Patent [19]

Sato et al.

[11] Patent Number: 4,461,532
[45] Date of Patent: Jul. 24, 1984

[54] HEAT RAYS REFLECTING FILM

[75] Inventors: Susumu Sato; Tadashi Hattori; Yoshiki Ueno; Takashi Taguchi, all of Okazaki, Japan

[73] Assignee: Nippon Soken, Inc., Nishio, Japan

[21] Appl. No.: 372,827

[22] Filed: Apr. 28, 1982

[30] Foreign Application Priority Data

Apr. 30, 1981 [JP] Japan ................... 56-66708

[51] Int. Cl.³ .......................... G02B 5/22; G02B 5/28
[52] U.S. Cl. ..................................... 350/1.6; 350/166
[58] Field of Search ................. 350/164, 166, 1.6

[56] References Cited

U.S. PATENT DOCUMENTS

| Re. 25,767 | 4/1965 | Auffenorde et al. |
| 2,624,823 | 1/1953 | Lytle |
| 2,698,261 | 12/1954 | Gaiser |
| 3,053,698 | 9/1962 | Ogle, Jr. et al. |
| 3,356,522 | 2/1964 | Libbert |
| 3,356,523 | 12/1967 | Libbert |
| 3,853,386 | 12/1974 | Ritter |
| 4,070,781 | 12/1978 | Sauer |
| 4,244,997 | 1/1981 | Postupack |

OTHER PUBLICATIONS

Zdenek Knittl, *Optics of Thin Films*, 1976, pp. 152-153.
Elmar Ritter, Optical Film Materials and Their Applications, *Applied Optics*, vol. 15, No. 10, Oct. 1976, pp. 2318-2327.

*Primary Examiner*—Bruce Y. Arnold
*Assistant Examiner*—William Propp
*Attorney, Agent, or Firm*—Cushman, Darby & Cushman

[57] ABSTRACT

A heat rays reflecting film composed of dielectric thin layers ($n_H$ layers) having a relatively high refractive index and dielectric thin layers ($n_L$ layers) having a relatively low refractive index which are alternately piled on one another, is disclosed. The first layer of the heat rays reflecting film, which contacts with the air is $n_L$ layer and the undermost layer which contacts with the window glass is $n_H$ layer. The optical thickness of the first layer is less than $\lambda/4$ while that of the other layers is $\lambda/4$. And the thickness of each layer is expressed by the formula: optical thickness/nv wherein nv is the refractive index for visible rays.

9 Claims, 4 Drawing Figures

HEAT RAYS REFLECTING FILM

BACKGROUND OF THE INVENTION

The present invention relates to a heat reflecting film, more particularly, to a heat reflecting film which is applied to a window glass of a vehicle, a building or the like for reflecting near infrared heat rays in sunlight.

Conventionally, in order to reduce the cooling load of an air conditioning system in the vehicle or the building, attempts have been made to apply such a film to intercept the heat rays in sunlight on the surface of the window glass. The above described films are formed of metal such as gold or aluminum. However, the metallic film has problems in that the visible rays do not sufficiently penetrate therethrough and that the heat rays are absorbed by the metallic film so that the absorbed heat is partially transmitted to the interior of the room.

In order to solve the above problems of the metallic film, an interference filtering film composed of a plurality of dielectric layers has been proposed and practically employed.

This interference filtering film can penetrate the visible rays and reflect only the infrared rays by selecting the optical thickness of each layers thereof.

The conventional interference filtering film is composed of two kinds of dielectric layers having a different refractive index, which are alternately piled up. And the optical thickness (refractive index X thickness) of each layer is precisely adjusted into λ/4 wherein λ is wavelength of the heat rays to be reflected by the interference filtering film.

The layer having a high refractive index is formed of zirconium oxide ($ZrO_2$), titanium oxide ($TiO_2$) cerium oxide ($CeO_2$) or the like. And the layer having a low refractive index is formed of magnesium fluoride ($MgF_2$), silicon oxide ($SiO_2$), cryolite ($Na_3AlF_6$), cerium fluoride ($CeF_2$) or the like. The above described material is adhered to the window glass by sputtering, vacuum evaporating, spraying or the like so that the formed film has a predetermined optical thickness.

In order to improve the reflecting effect of the heat reflecting film, it is required to increase the number of the layers and to precisely adjust the optical thickness of each layer.

However, it is difficult for the present level of application technique to form a film composed of a large number of layers of which the optical thickness is not scattered.

When the thickness of each layer is widely scattered, the transmittance of the visible rays is largely affected causing uneveness in color.

When the number of the layers is decreased, the scattering of the optical thickness of each layer can be decreased but high heat rays reflecting efficiency cannot be obtained.

The conventional heat reflecting film has another problem as described below.

Generally, the thickness of each layer of the heat reflecting film is expressed by the formula: optical thickness/refractive index. The refractive index (nλ) for the heat rays having wavelength of λ has been conventionally used in the above formula.

The refractive index for the incident rays changes in accordance with the wavelength thereof and particularly, greatly changes as the wavelength is decreased.

And the refractive index also changes in accordance with the material of each layer of the film.

Therefore, when the thickness of each layer of the heat reflecting film is determined by using the refractive index for the heat rays as described above, the obtained thickness greatly differs from such a thickness as to transmit the visible rays.

As a result, the peak reflectance of the film for the visible rays is large.

This phenomenon is particularly observed when the incident angle of the incident rays to the normal line of the surface of the heat reflecting film is large.

Accordingly, one object of the present invention is to provide a heat reflecting film (hereinafter referred to as "heat rays reflecting film") which is suitable for applying to the window glass of the vehicle or the building in order to decrease cooling load of an air conditioning system therewithin.

Another object of the present invention is to provide a heat rays reflecting film having heat rays reflectance substantially equal to that of the conventional interference filtering film and having improved transmittance of the visible rays.

Still another object of the invention is to provide a heat rays reflecting film of which the peak reflectance for visible rays is reduced in order that the objects outside of the window can be seen without any change to their color.

BRIEF DESCRIPTION OF THE DRAWINGS

Other objects and advantages of the invention will become apparent from the following description of embodiments thereof with reference to the accompanying drawings wherein.

SUMMARY OF THE INVENTION

The heat rays reflecting film of the present invention is composed of dielectric thin layers ($n_H$ layers) having a relatively high refractive index and dielectric thin layers ($n_L$ layers) having a relatively low refractive index which are alternately piled on one another.

The first layer of the heat rays reflecting film, which contacts with the medium (air) is $n_L$ layer and the undermost layer which contacts with the base plate (window glass) is $n_H$ layer.

The optical thickness (refractive index X thickness of layer) of the first layer is less than λ/4 while that of the other layers is λ/4. And the thickness of each layer is expressed by the formula: optical thickness/nv wherein nv is the refractive index for visible rays.

The $n_H$ layers are formed of zirconium oxide, titanium oxide, cerium oxide or the like and the $n_L$ layers are formed of magnesium fluoride, silicon oxide, cryolite, cerium fluoride, or the like.

The $n_H$ layers and the $n_L$ layers may be formed of the same material as each other.

The preferable range of the optical thickness of the first layer is from $\lambda/16$ to $\lambda/5$ and the most preferable thickness is $\lambda/8$ or thereabouts.

The most important point of the present invention is to compose the first layers to be contact with the air of $n_L$ layer of which optical thickness is less than $\lambda/4$, and to determine the thickness of each layer not by the refractive index for heat rays to be reflected but by that for visible rays.

According to the heat rays reflecting film of the present invention, the heat rays reflectance thereof can be maintained equal to the conventional dielectric interference filtering film and the peak visible rays reflectance can be greatly reduced so that the transmittance of the visible rays can be largely improved as compared with the conventional film.

DETAILED DESCRIPTION OF INVENTION

Hereinafter, the present invention will be explained in accordance with the embodiments with reference to the accompanying drawings.

Figure 1:
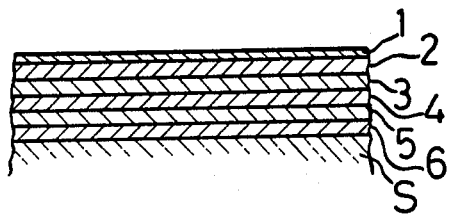
FIG. 1 is a sectional view illustrating a first embodiment of the heat rays reflecting film of the present invention.

FIG. 1 illustrates a first embodiment of the present invention. The heat rays reflecting film of the first embodiment is composed of a first layer 1, a second layer 2, a third layer 3, a fourth layer 4, a fifth layer 5 and a sixth layer 6. The sixth layer 6 is joined to quartz glass S acting as a base plate. The first layer 1 contacts the air. The material, optical thickness and layer thickness are shown in Table 1.

TABLE 1

| No. | Layer Number | Material | Optical thickness | Layer thickness ($\mu$m) |
|---|---|---|---|---|
| 1 | first layer ($n_L$) | SiO$_2$ | $\lambda/8$ | 0.094 |
| 2 | second layer ($n_H$) | TiO$_2$ | $\lambda/4$ | 0.102 |
| 3 | third layer ($n_L$) | SiO$_2$ | $\lambda/4$ | 0.188 |
| 4 | fourth layer ($n_H$) | TiO$_2$ | $\lambda/4$ | 0.102 |
| 5 | fifth layer ($n_L$) | SiO$_2$ | $\lambda/4$ | 0.188 |
| 6 | sixth layer ($n_H$) | TiO$_2$ | $\lambda/4$ | 0.102 |
| S | base plate | glass | — | 3 (mm) |

The layer thickness was determined by the following method.

Figure 2:
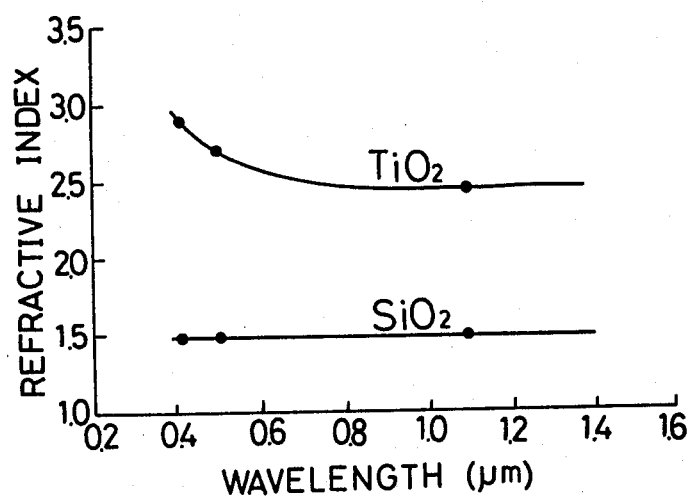
FIG. 2 is a graph showing relation between the refractive indices of $SiO_2$ and $TiO_2$, and the wavelength.

FIG. 2 shows the relation between the refractive indices of titanium oxide and silicon oxide, and the wavelength of incident rays. In the first embodiment, as the refractive indices of titanium oxide and silicon oxide, the refractive indices corresponding to the wavelength of 0.5 $\mu$m were used.

In this case, the refractive index $n_{VH}$ of titanium oxide was about 2.7 and that of $n_{VL}$ of silicon oxide was about 1.46.

And the wavelength $\lambda$ of the heat rays to be reflected was 1.1 $\mu$m. The layer thickness (optical thickness/refractive index) was determined by using the above described refractive index and wavelength.

Figure 3:
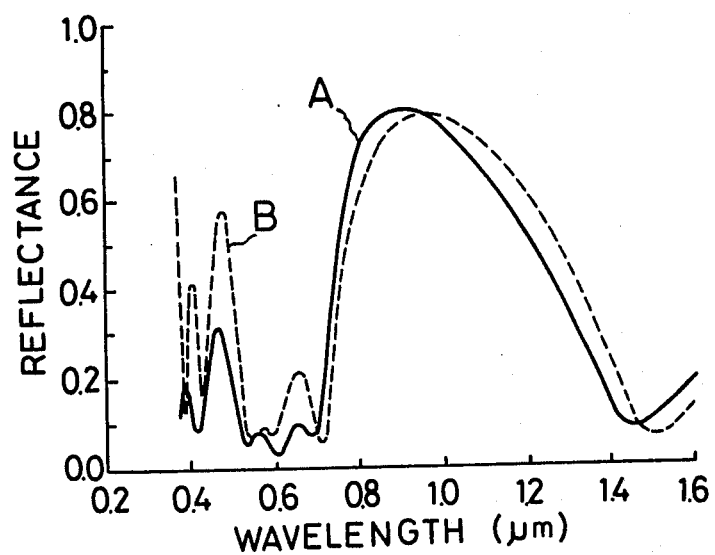
FIG. 3 is a graph showing spectral reflection characteristics of the heat rays reflecting film of the first embodiment and the conventional heat rays reflecting film.

FIG. 3 shows spectral reflection characteristics of the heat rays reflecting film of the first embodiment A and that of the conventional heat rays reflecting film B when the incident angle of the incident rays is 60°. The above described conventional film is composed of five layers having an optical thickness of $\lambda/4$, respectively without being provided with the first layer of the first embodiment of the present invention. And the layer thickness of the conventional film was determined by the refractive indices corresponding to the wavelength of heat rays (about 1.1 $\mu$m). Namely, refractive index of titanium oxide was about 2.42 and that of silicon oxide was about 1.45.

As is apparent from FIG. 3, the reflectance of the heat rays reflecting film of the first embodiment (line A) is not largely changed from that of the conventional film (line B) for the heat rays (of which wave length is not less than 0.7 $\mu$m). And the reflectance for the visible rays (of which wavelength is 0.4 to 0.7 $\mu$m) is much decreased as compared with the conventional film.

The average reflectance of the heat rays reflecting film of the present invention, for the visible rays is about 0.12 and that of the conventional film is about 0.24.

Furthermore, according to the present invention, the peak reflectance for the visible rays can be greatly reduced.

As a result, the difference in reflectance for the visible rays is small so that the objects can be seen through the window glass without any change in their color.

Hereinafter, a second embodiment of the present invention will be explained.

The material, number of layers and optical thickness of each layer of the second embodiment are similar to those of the first embodiment.

In the second embodiment, the refractive indices corresponding to the wavelength of about 0.42 $\mu$m were used for determining the layer thickness. The layer formed of titanium oxide has a refractive index of about 2.9 and the layer formed of silicon oxide has a refractive index of about 1.47.

The material, optical thickness, and layer thickness are shown in Table 2.

TABLE 2

| No. | Layer number | Material | Optical thickness | Layer thickness ($\mu$m) |
|---|---|---|---|---|
| 1 | first layer ($n_L$) | SiO$_2$ | $\lambda/8$ | 0.0935 |
| 2 | second layer ($n_H$) | TiO$_2$ | $\lambda/4$ | 0.095 |
| 3 | third layer ($n_L$) | SiO$_2$ | $\lambda/4$ | 0.187 |
| 4 | fourth layer ($n_H$) | TiO$_2$ | $\lambda/4$ | 0.095 |
| 5 | fifth layer ($n_L$) | SiO$_2$ | $\lambda/4$ | 0.187 |
| 6 | sixth layer ($n_H$) | TiO$_2$ | $\lambda/4$ | 0.095 |
| S | base plate | glass | — | 3 (mm) |

Figure 4:
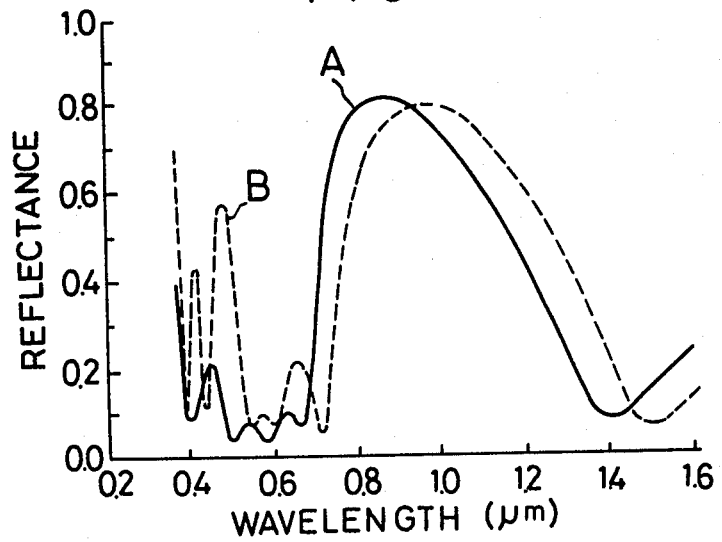
FIG. 4 is a graph showing spectral reflection characteristics of the heat rays reflecting film of a second embodiment of the present invention and the conventional heat rays reflecting film.

The spectral reflection characteristic of the heat rays reflecting film of the second embodiment and that of the conventional heat rays reflecting film, which was measured when the incident angle of the incident rays is 60°, is shown in FIG. 4.

In FIG. 4, the line A shows the spectral reflection characteristic of the second embodiment and the line B shows that of the conventional film.

As is apparent from FIG. 4, according to the second embodiment, the reflectance for heat rays scarcely changes and that for visible rays is greatly reduced as compared with the conventional film.

As a result, transmittance for visible rays is largely improved.

According to the present invention, several embodiments other than the above described embodiments are possible.

For example, the layers having the same refractive index can be formed of different materials from one another if the refractive index of each layer alternately changes.

The wavelength $\lambda$ is not limited to 1.1 $\mu$m, and is determined in accordance with the desired wavelength region to be reflected or transmitted.

For example, by changing the wavelength $\lambda$ into 1.2 to 1.25 $\mu$m in the second embodiment, the line A (heat rays reflecting film of the present invention) shifts to the long wavelength side in FIG. 4.

As a result, the heat rays region to be reflected can be made equal to that of the line B.

The number of layers composing the heat rays reflecting film is not limited to six. For example, four or eight layers will do.

According to the present invention, by forming the first layer of the heat rays reflecting film, which contacts with the air, so as to have an optical thickness of less than $\lambda/4$, the average reflectance for visible rays can be reduced. The most preferable optical thickness is $\lambda/8$.

Furthermore, by employing the refractive index for visible rays to determine the layer thickness, the reflectance for all of the visible rays region can be made substantially equal whether the incident angle of incident rays is large or not.

As a result, the uneveness in color disappears so that the objects outside of the window glass can be seen without any change in color.

And since the average reflectance of the heat rays reflecting film for visible rays is reduced according to the present invention, persons can be prevented from being dazzled by the visible rays reflected on the surface of the window glass.

Having now fully described the invention, it will be apparent to one of ordinary skill in the art that many changes and modifications can be made thereto without departing from the spirit or scope of the invention as set forth herein.

What is claimed is:

1. A heat reflecting film, for reflecting near infrared rays in sunlight, which is formed on the surface of a base plate, said film comprising:

first dielectric thin layers having a low refractive index; and second dielectric thin layers having a refractive index higher than that of said first dielectric thin layers;

said first dielectric thin layers and said second dielectric thin layers being alternately piled up so that one of said first dielectric thin layers contacts with the air and one of said second dielectric thin layers contacts with said base plate;

said one first dielectric thin layer contacting with the air and having an optical thickness of $\lambda/8$, wherein $\lambda$ is wavelength of the near infrared rays to be reflected;

the other first dielectric thin layers and all of said second dielectric thin layers having optical thickness of $\lambda/4$;

provided that each of said layers has thickness expressed by the formula:

thickness = optical thickness/$n_v$, wherein $n_v$ is the refractive index at each said layer for a visible wavelength of interest.

2. A heat reflecting film according to claim 1, wherein:

said first dielectric thin layers are formed of magnesium fluoride, silicon oxide, cryolite, or cerium fluoride; and said second dielectric thin layers are formed of zirconium oxide, titanium oxide or cerium oxide.

3. A heat reflecting film according to claim 2, wherein:

said first dielectric thin layers are each formed of the same material.

4. A heat reflecting film according to claim 2, wherein:

said second dielectric thin layers are each made of the same material.

5. A heat reflecting film according to claim 2, wherein:

said first and second dielectric thin layers are formed on said base plate, in order, by either a sputtering, evaporating or spraying method.

6. A heat reflecting film according to claim 1, wherein:

said film is composed of four, six or eight layers.

7. A heat reflecting film according to claim 1, wherein:

said base plate is a window glass; and said film is formed on the inner surface or the outer surface of the window glass of a vehicle or a building.

8. A heat reflecting film according to claim 1, wherein:

said $n_v$ is the refractive index for a visible wavelength of of 0.5 $\mu$m.

9. A heat reflecting film according to claim 1, wherein:

said $n_v$ is the refractive index for a visible wavelength of 0.42 $\mu$m.

* * * * *